United States Patent [19]

Sekiguchi

[11] Patent Number: 5,529,389
[45] Date of Patent: Jun. 25, 1996

[54] BRAKE CONTROL UNIT

[75] Inventor: Akihiko Sekiguchi, Kazo, Japan

[73] Assignee: Akebono Brake Industry Co., Ltd., Tokyo, Japan

[21] Appl. No.: 333,863

[22] Filed: Nov. 3, 1994

Related U.S. Application Data

[63] Continuation of Ser. No. 212,685, Mar. 11, 1994, abandoned, which is a continuation of Ser. No. 997,662, Dec. 23, 1992, abandoned, which is a continuation of Ser. No. 677,322, Mar. 29, 1991, abandoned.

[30] Foreign Application Priority Data

Mar. 30, 1990 [JP] Japan .................. 2-34734 U

[51] Int. Cl.⁶ .................................. B60T 8/32
[52] U.S. Cl. .................. 303/116.4; 303/10; 303/113.1; 303/113.2; 303/119.1; 137/884; 417/360
[58] Field of Search ................ 303/113.1–119.2, 303/50, 91, 10–12; 137/884, 596.17, 560, 899, 351; 417/423.14, 360, 540, 410.1, 533, 535–537, 539; 188/181 A, 181 R, 181 T, 344; 335/278, 250; 439/13, 34, 544

[56] References Cited

U.S. PATENT DOCUMENTS

| | | | |
|---|---|---|---|
| 3,111,139 | 11/1963 | Beckett et al. | 137/884 |
| 3,158,164 | 11/1964 | Barton | 137/884 |
| 3,384,115 | 5/1968 | Drazan et al. | 137/884 |
| 3,457,943 | 7/1969 | Kawabata | 137/884 |
| 3,538,947 | 11/1970 | Leiber . | |
| 3,589,387 | 6/1971 | Raymond | 137/884 |
| 3,665,961 | 5/1972 | Bachmann | 137/884 |
| 3,829,166 | 8/1974 | Menar et al. | 303/116.1 X |
| 4,025,124 | 5/1977 | Fuchs | 303/10 |
| 4,310,201 | 1/1982 | Pauwels | 303/113.2 |
| 4,381,125 | 4/1983 | Wilson | 303/116.4 |
| 4,568,131 | 2/1986 | Blomberg et al. | 303/61 |
| 4,597,611 | 7/1986 | Nishimura et al. | 303/116 PC |
| 4,626,045 | 12/1986 | Takei et al. | 303/119 SV |
| 4,636,011 | 1/1987 | Blomberg et al. . | |
| 4,640,311 | 2/1987 | Martinet et al. | 137/884 |
| 4,655,509 | 4/1987 | Ando et al. | 303/10 |

(List continued on next page.)

FOREIGN PATENT DOCUMENTS

| | | | |
|---|---|---|---|
| 2398245 | 3/1979 | France | 137/886 |
| 2654930 | 6/1977 | Germany | 137/886 |
| 129359 | 11/1978 | Germany | 137/886 |
| 3810581 | 10/1989 | Germany | 303/119 SV |
| 1156161 | 6/1989 | Japan | 303/119.2 |
| 2225168 | 5/1990 | United Kingdom | 303/119 SV |
| 8301929 | 6/1983 | WIPO | 303/116.4 |

OTHER PUBLICATIONS

SAE publication 920647, "Compact ABS Modulator with Small–Solenoid–Valves" by Fujita, Miyata and Maehara, from SAE, SP–914, *ABS/Traction Control Advanced Brake Systems*, Feb. 24–28, 1992 International Congress nad Exposition, Detroit, Mich., ISBN 1-56091-231-6, pp. 101–107.

H. Leiber et al., "The potential and the problems involved in integrated anti–lock braking systems", Automobile Division of the Institution of Mechanical Engineers, pp. 169–175, Sep. 1985.

H. Demel et al., "ABS and ASR for Passenger Cars—Goals and Limits", SAE Technical Paper Series 890834, Society of Automotive Engineers, Inc., Feb.–Mar. 1989.

Koichi Hasida et al., "Compact 4CH–ABS Hydraulic Unit", SAE Technical Paper Series 910697, Society of Automotive Engineers, Inc., 1991.

*Primary Examiner*—Douglas C. Butler
*Attorney, Agent, or Firm*—Knobbe, Martens, Olson & Bear

[57] ABSTRACT

A brake control unit to be used in an anti-lock control or the like which can be mounted in a small space. The brake control unit comprising a pump housing block having an accumulator and a pump installed therein, a first and a second solenoid valves of which one ends are connected to one surface of the pump housing block and vertically installed, and a motor M vertically connected to one surface of the pump housing block in parallel with the first and second solenoid valves.

4 Claims, 8 Drawing Sheets

U.S. PATENT DOCUMENTS

| | | | |
|---|---|---|---|
| 4,690,465 | 9/1987 | Takeda et al. | 303/116 PC X |
| 4,705,324 | 11/1987 | Kervagoret | 303/119 SV |
| 4,753,494 | 6/1988 | Antrobus | 303/61 |
| 4,785,848 | 11/1988 | Leiber | 137/884 X |
| 4,796,958 | 1/1989 | Brown, Jr. | 303/50 X |
| 4,828,335 | 5/1989 | Fuller et al. | 303/119.2 X |
| 4,842,525 | 6/1989 | Galloway et al. | 303/119 SV |
| 4,883,327 | 11/1989 | Farr | 303/116.4 |
| 4,907,842 | 3/1990 | Goldfein . | |
| 4,929,038 | 5/1990 | Reinartz et al. | 137/884 X |
| 4,953,918 | 9/1990 | Hashida et al. | 303/116 PC |
| 4,955,673 | 9/1990 | Fukuda | 303/91 X |
| 4,997,238 | 3/1991 | Kohno et al. | 303/116 R |
| 4,998,781 | 3/1991 | Kehl et al. | 303/116 PC |
| 5,011,238 | 4/1991 | Brown, Jr. | 303/113 TR |
| 5,022,717 | 6/1991 | Heibel et al. | 303/119 SV |
| 5,035,469 | 7/1991 | Geilen et al. | 303/116.1 X |
| 5,094,268 | 3/1992 | Morel et al. | 137/884 |
| 5,222,524 | 6/1993 | Sekler et al. | 137/884 |
| 5,362,137 | 11/1994 | Kohno | 303/116.4 |
| 5,364,067 | 11/1994 | Linkner, Jr. . | |
| 5,403,077 | 4/1995 | Burgdorf et al. | 137/884 |

BRAKE CONTROL UNIT

This application is a continuation of U.S. application Ser. No. 08/212,685 filed Mar. 11, 1994, now abandoned, which is a continuation of U.S. application Ser. No. 07/997,662 filed on Dec. 23, 1992, now abandoned, which application is a continuation of U.S. application Ser. No. 07/677,322 filed on Mar. 29, 1991, now abandoned.

BACKGROUND OF THE INVENTION

This invention relates to a brake control unit to be used in a brake system in a vehicle.

More particularly, the present invention relates to a brake control unit installed in a brake liquid supplying line extending from a master cylinder of a vehicle to a wheel cylinder and applied for an anti-lock control for the vehicle or the like.

Figure 8:
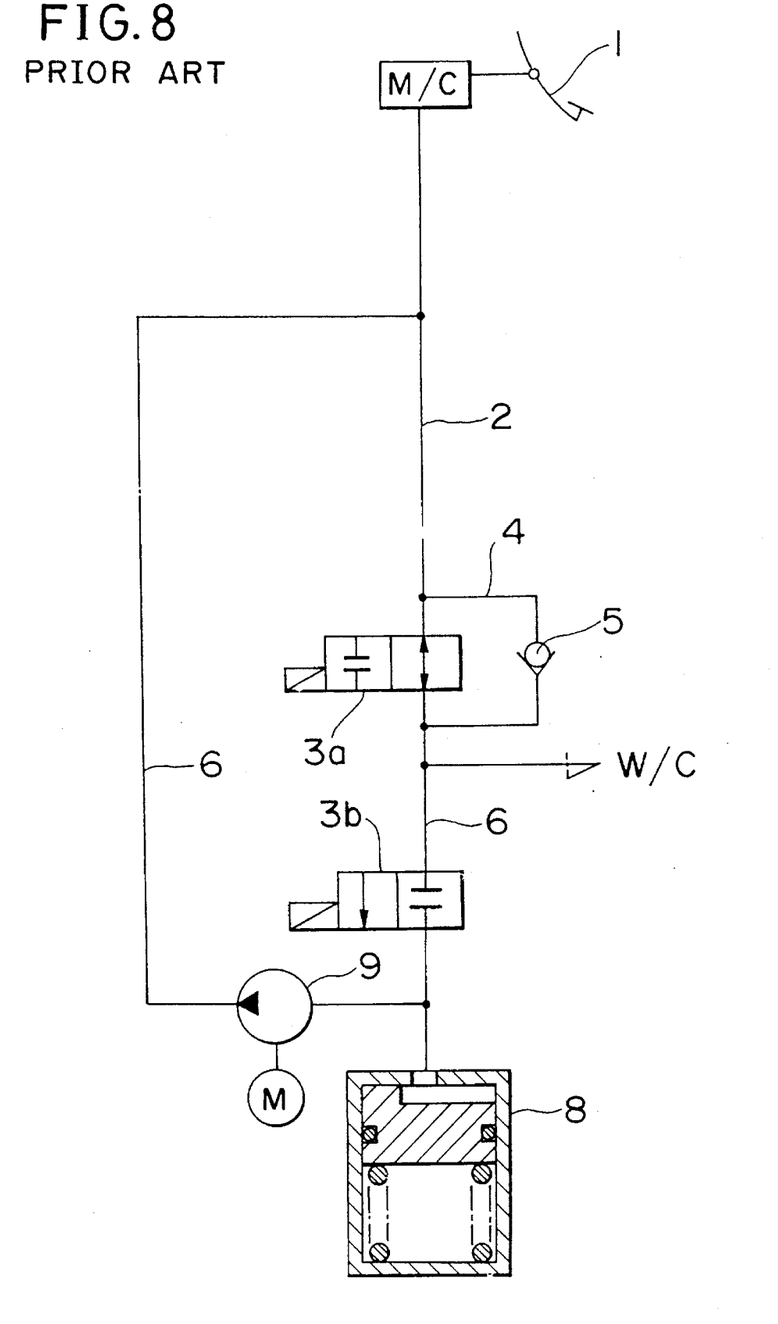
FIG. 8 is a systematic view for showing a brake liquid supplying system in each of the prior art and the present invention.

As prior art of this kind of brake control unit, a brake liquid supplying line extending from a master cylinder M/C to a wheel cylinder W/C in an anti-lock control device will be described in reference to FIG.8.

In this figure, a hold valve 3a composed of a normally-opened solenoid valve is placed on a major liquid pressure line 2 extending from the master cylinder M/C connected to a brake pedal 1 to the wheel cylinder W/C. A bypassing liquid circuit 4 for bypassing this hold valve 3a is provided, and a check valve 5 for allowing only a liquid flow from the wheel cylinder W/C to the master cylinder M/C to be flowed in case that a liquid pressure of the wheel cylinder W/C is more than a predetermined value is placed on the bypassing liquid line 4.

On a return liquid line 6 extending from the aforesaid wheel cylinder W/C to the master cylinder M/C are placed a decay valve 3b composed of a normally-closed solenoid valve, an accumulator 8 and a pump 9 driven by a motor M, respectively.

With such a configuration as above, the hold valve 3a and the decay valve 3b are controlled for their opening or closing operation properly with a control part not shown, thereby a liquid pressure within the wheel cylinder W/C is controlled and then a lock of the wheels in case of braking the vehicle is prevented.

In case of a vehicle provided with a vehicle braking auxiliary mechanism such as the aforesaid anti-lock control device, it is a substantial problem to keep an assemblying space for these mechanisms and in case of either a vehicle or a small-sized vehicle having another electronic control mechanism already installed therein, it is sometimes found that there is no piping space for assemblying these mechanisms.

A technical concept for making a unit of valves to be used in the anti-lock mechanisms is also disclosed in the specification of U.S. Pat. No. 3,538,947.

Accordingly, both a pump housing and a solenoid housing are provided for each of the solenoid valves and the anti-lock mechanism can be formed into a unit device. However, a structure in which the motor M is fixed to the pump housing becomes a structure in which a portion of the motor M is projected from the side surface of the pump housing and this shows a problem that a large-sized unit itself may not be avoided.

SUMMARY OF THE INVENTION

The present invention has been invented in view of the afore-said problems and it is an object of the present invention to provide a brake control unit which can be installed in a saved spacing.

Initially, in the brake control unit of the present invention, the first solenoid valve installed between the master cylinder and the wheel cylinder to control a supplying liquid pressure for the wheel cylinder, and the second solenoid valve for controlling a discharged liquid pressure from the wheel cylinder are connected at their one ends to one surface of the pump housing block.

An accumulator for accumulating the brake liquid passed through the second solenoid valve and a pump for returning the brake liquid from the accumulator to the passage in the master cylinder are stored in the pump housing block.

One end of the motor for driving the pump is connected in parallel with the first and second solenoid valves at one surface of the pump housing block.

Secondly, in the brake control unit of the present invention, the motor is fixed to the pump housing block by a bolt passed from an opposite surface of the pump housing block opposite to the surface to which the motor is connected to the pump housing block.

Thirdly, in the brake control unit of the present invention, to one surface of the pump housing block is fixed a solenoid housing block for use in storing the first and second solenoid valves.

Fourthly, in the brake control unit of the present invention, to the surface of the pump housing block opposite to the surface to which the motor is connected is fixed a traction control unit.

DESCRIPTION OF THE PREFERRED EMBODIMENTS

The present invention is constructed such that an accumulator 8 and a pump 9 are stored within a pump housing block 12, a solenoid valve 3 and a motor M are attached flush to the common surface of the pump housing block 12 to constitute a brake control unit, thereby a piping between each of the members such as the solenoid valve 3 or the like can be realized by a punching hole in the pump housing block 12, and the solenoid valve 3 and the motor M are concentrically connected to one surface of the pump housing block 12, resulting in that a small-sized and light-weight brake control unit can be realized.

Referring now to FIGS. 1 to 5, some preferred embodiments of the present invention will be described.

Figure 4:
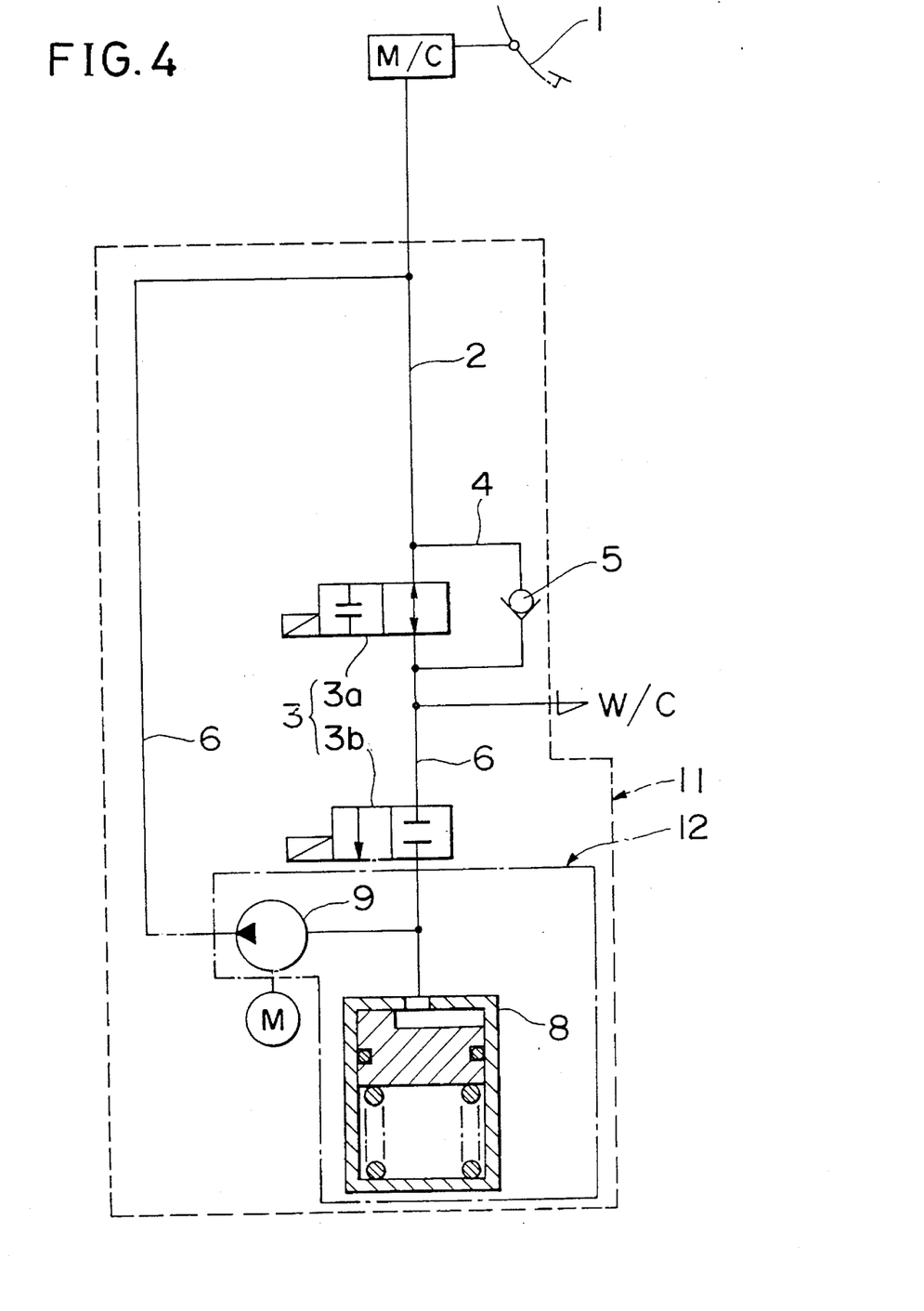
FIG. 4 is a functional systematic diagram for showing a brake control unit of the preferred embodiment, which is generally housed into two blocks as shown by two dotted lines.

The brake control unit 11 of the present invention is placed between the master cylinder M/C and the wheel cylinder W/C, and its function corresponds to a part enclosed by a broken line in FIG. 4. Other portions in this figure are similar to that of the prior art of FIG. 8, so that its description will be eliminated.

Figure 5A:
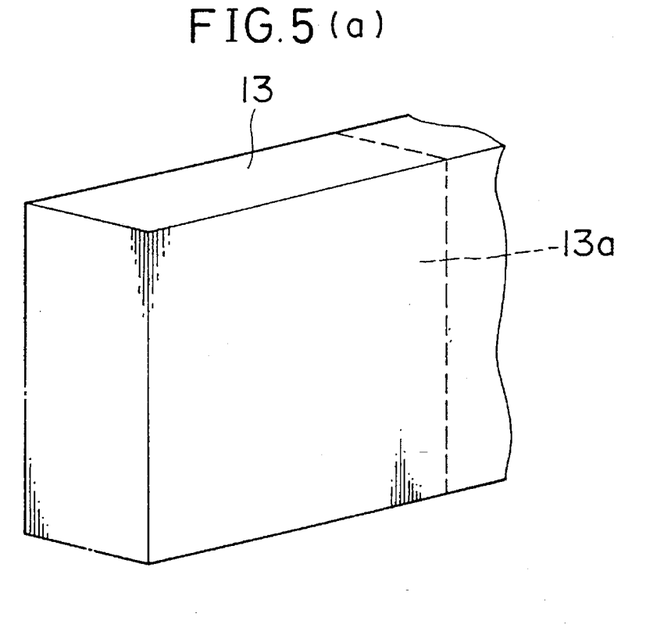
FIGS.5(a) and 5(b) are perspective views of bar members to be used in the pump housing block and the solenoid housing block.

The brake control unit 11 has as its basic unit the pump housing block 12. The pump housing block 12 is made such that an aluminum alloy shown in FIG. 5(a) is pulled out or pushed to form a bar member 13, the bar member 13 is cut at a predetermined spacing to get block bodies 13a. Predetermined holes are formed in the block bodies 13a and the closing operation is carried for them. In addition, within the housing block 12, the pump 9 and the accumulator 8 are installed through a punching operation.

At one surface of the aforesaid housing block 12 are connected the hold valve 3a of the first solenoid valve and the decay valve 3b of the second solenoid valve at their one end. In the following description, as required, the hold valve 3a and the decay valve 3b are collectively referred to as a solenoid valve 3.

In the brake control unit 11 of the present preferred embodiment, two sets each of hold valve 3a and the decay valve 3b, i.e. four solenoid valves 3, are connected. Accordingly, an anti-lock control in two systems can be carried out in the brake control unit 11.

Figure 5B:
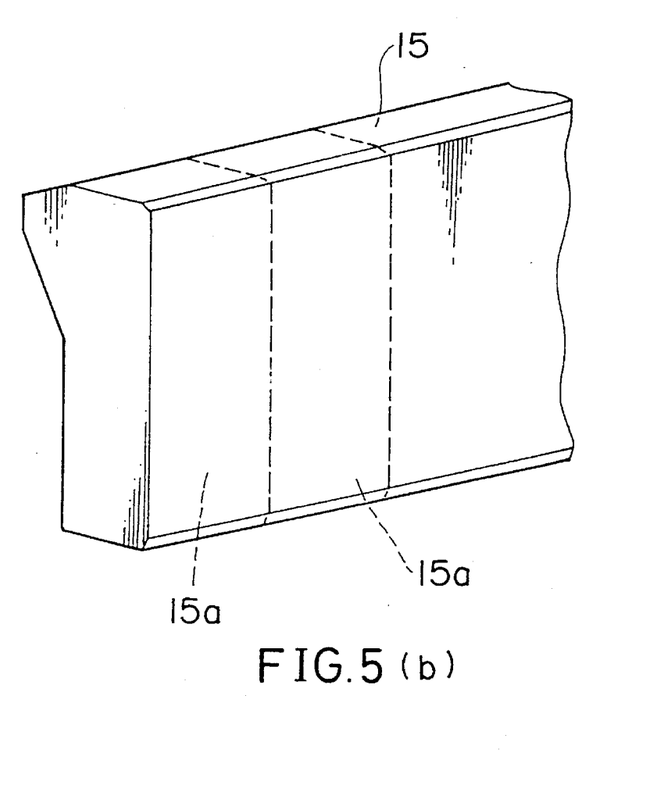

To the other end of the solenoid valve 3, i.e. the end part of the opposite pump housing block is connected the solenoid block 14. The solenoid block 14 is constructed such that the aluminum alloy shown in FIG. 5(b) is pulled out or pushed out to form in the same manner as that of the pump housing block 12 to get the bar member 15. The bar member 15 is cut at a predetermined spacing to get some blocks 15a, and a pair of right and left symmetrical blocks are arranged and then a predetermined punching and a closing operation are carried out.

As to the pump housing block 12 and the solenoid block 14, it is also possible to cast directly the aluminum alloy. However, its die cast mold is complex and costly and a manufacturing accuracy of the material may not be attained and so it is preferable that the pulling-out operation or the extruding molding is carried out.

To one surface of the solenoid block 14 are opened pipe connection ports 16a, 16b for the wheel cylinder W/C and a pipe connection port 17 for the master cylinder M/C. The solenoid block 14 and the pump housing block 12 are fixed by bolts 19 passing from the rear surface side of the pump housing block 12. A pipe 18 is arranged between the solenoid block 14 and the pump housing block 12, and a passage within this pipe may bypass the solenoid valve 3 and become a return liquid passage 6 reaching from the pump 9 to the master cylinder M/C.

Figure 3:
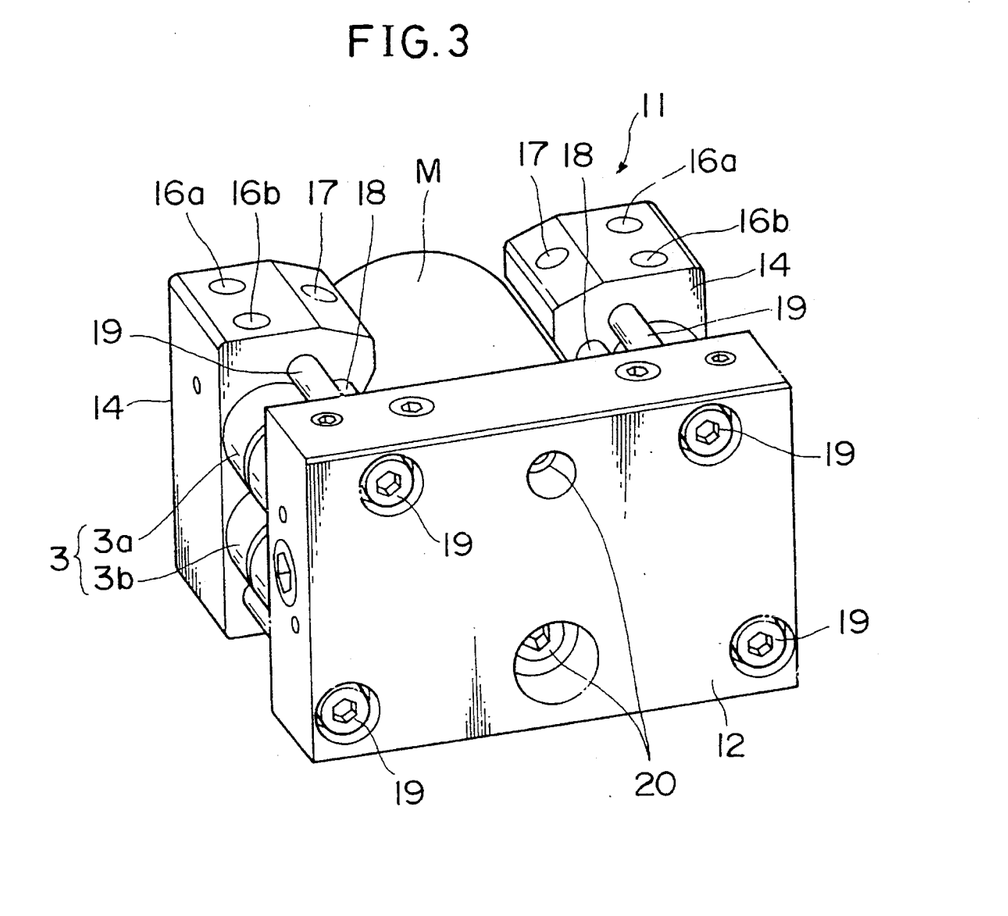
FIG. 3 is a perspective view for showing as viewed from an upper part of a rear surface a motor fixing structure.

In the pump housing block 12, the motor M is connected to the same surface as that of the solenoid valve 3. The motor M is applied for driving the pump 9 within the pump housing block 12 and is made such that the pumps 9 in the two systems (not shown) are driven by a single motor M. As shown in FIG. 3. the motor M is fastened the pump housing block 12 by the motor fixing bolts 20 passed through the other side (rear surface) of the pump housing block 12 with respect to the connecting end surface. In this way, in the preferred embodiment, the motor M is directly fastened by the motor fixing bolts 20 passed from the other surface of the pump housing block 12 in respect to the connection end surface of the motor M, so that a surplus member such as a fixing flange or the like is not required in a circumferential direction of the extreme end of the motor M, for example, but a relatively large diameter motor M can also be mounted on the surface of the pump housing block of small area.

Figure 1:
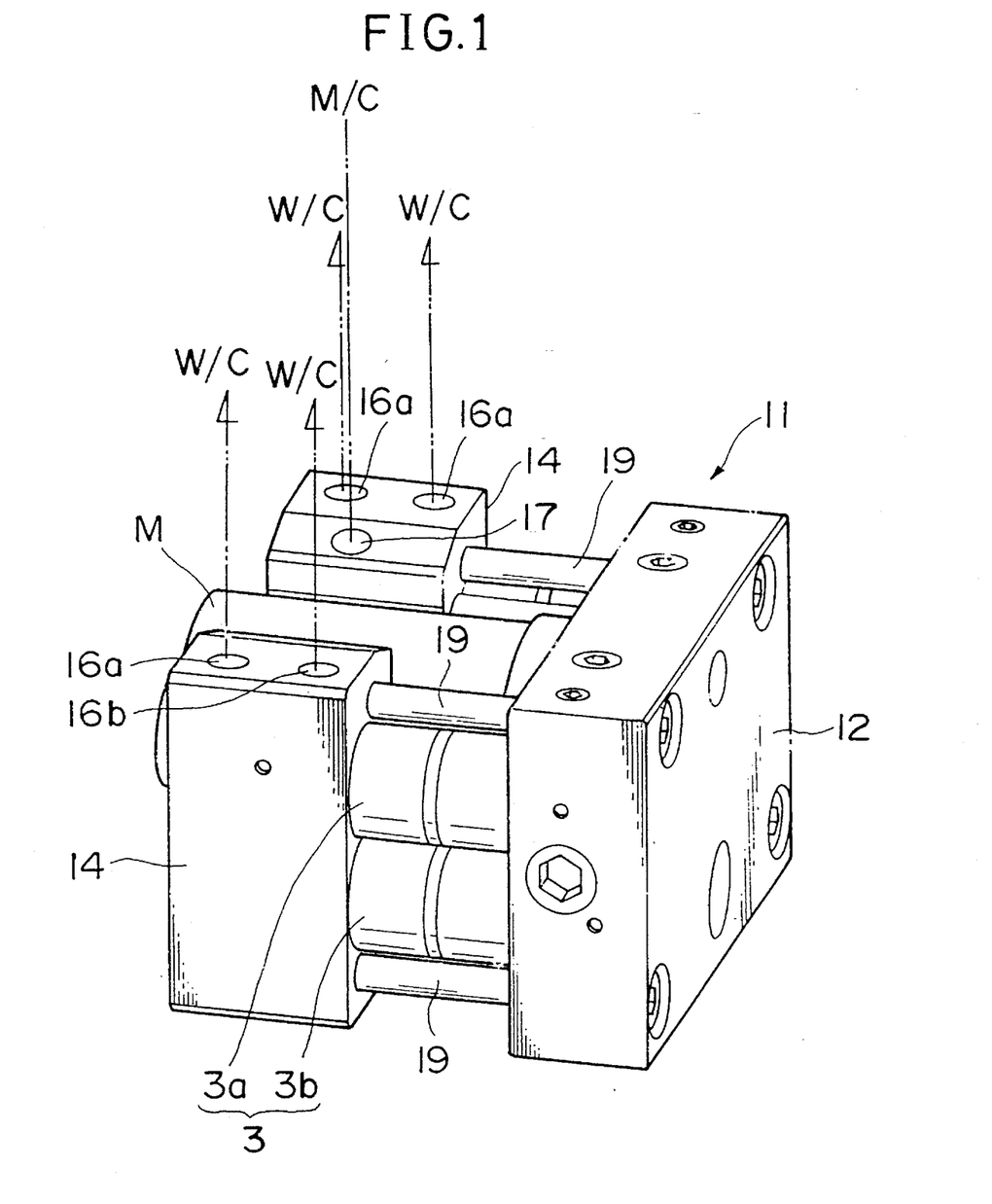
FIG. 1 is a perspective view for showing as viewed from a right upper side a brake control unit of one preferred embodiment of the present invention.
Figure 2:
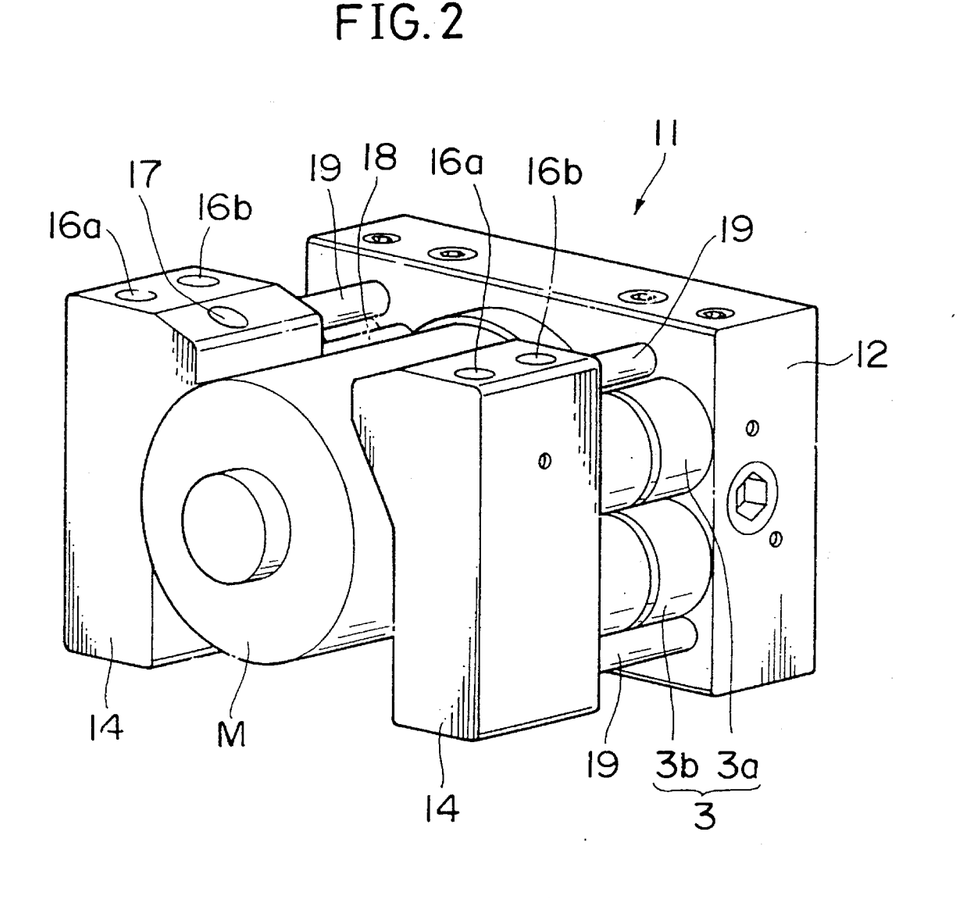
FIG. 2 is a perspective view for showing as viewed from a left upper side a brake control unit.

In this way, in the preferred embodiment, the anti-lock control mechanism reaching from the master cylinder M/C to the wheel cylinder W/C is made as a single unit structure, and the solenoid valves 3 and the motor M are concentrically arranged at one surface side of the pump housing block 12 acting as a basic body of the unit, resulting in that it is possible to provide the anti-lock device which can be mounted in a small space within a vehicle. Furthermore, as shown in FIGS. 2 and 6, the two sets of hold valve 3a and decay valve 3b are arranged in a symmetrical manner with respect to the motor M at one surface of the pump housing block.

The pump driving motor M is fastened with the motor fixing bolts 20 passed from the other surface of the pump housing block 12, thereby it is not necessary to project the fixing flange to the motor M and it is further possible to mount the large-sized large diameter and large output motor M in a small area on the pump housing block 12 and then the anti-lock control mechanism can be realized with a single brake control unit in the two systems.

Figure 6:
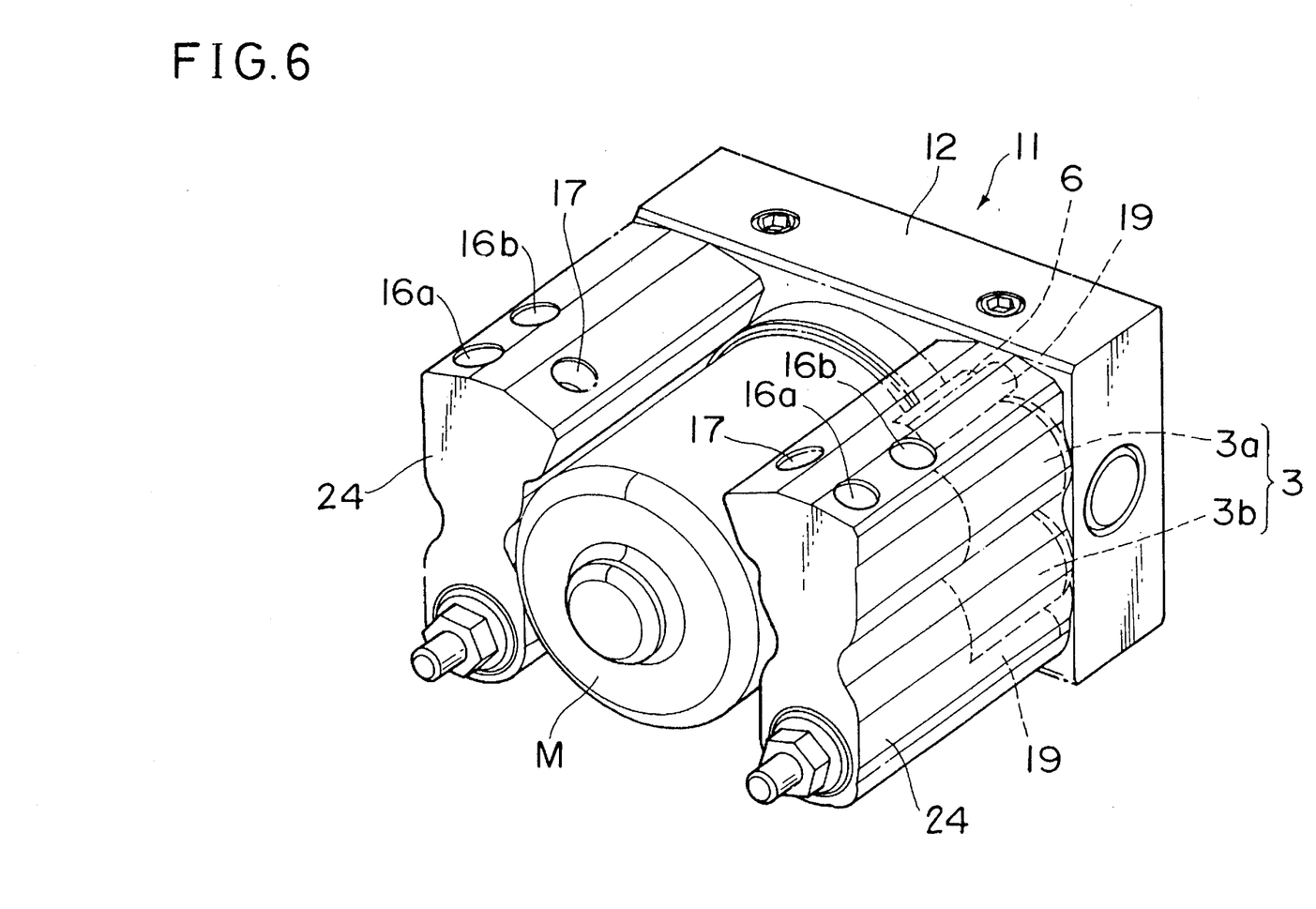
FIG. 6 is a perspective view for showing a brake control unit of another preferred embodiment of the present invention as viewed from the right upper direction of the unit.

In another preferred embodiment of the brake control unit shown in FIG. 6, the solenoid valve 3 are stored within a solenoid housing block 24. In this case, the solenoid housing block 24 has a sufficient size for storing the solenoid valves 3, is abutted against one surface of the pump housing block 12 and further the spacing storing the solenoid valve 3 and the return liquid passage 6 are punched and machined.

According to the aforesaid preferred embodiments, the accumulator and the pump are installed within the pump housing block and the solenoid valve and the motor M are connected in the same surface side in respect to the pump housing block to form a unit structure, thereby it is possible to realize the anti-lock control mechanism which can be mounted in a quite small spacing.

Figure 7:
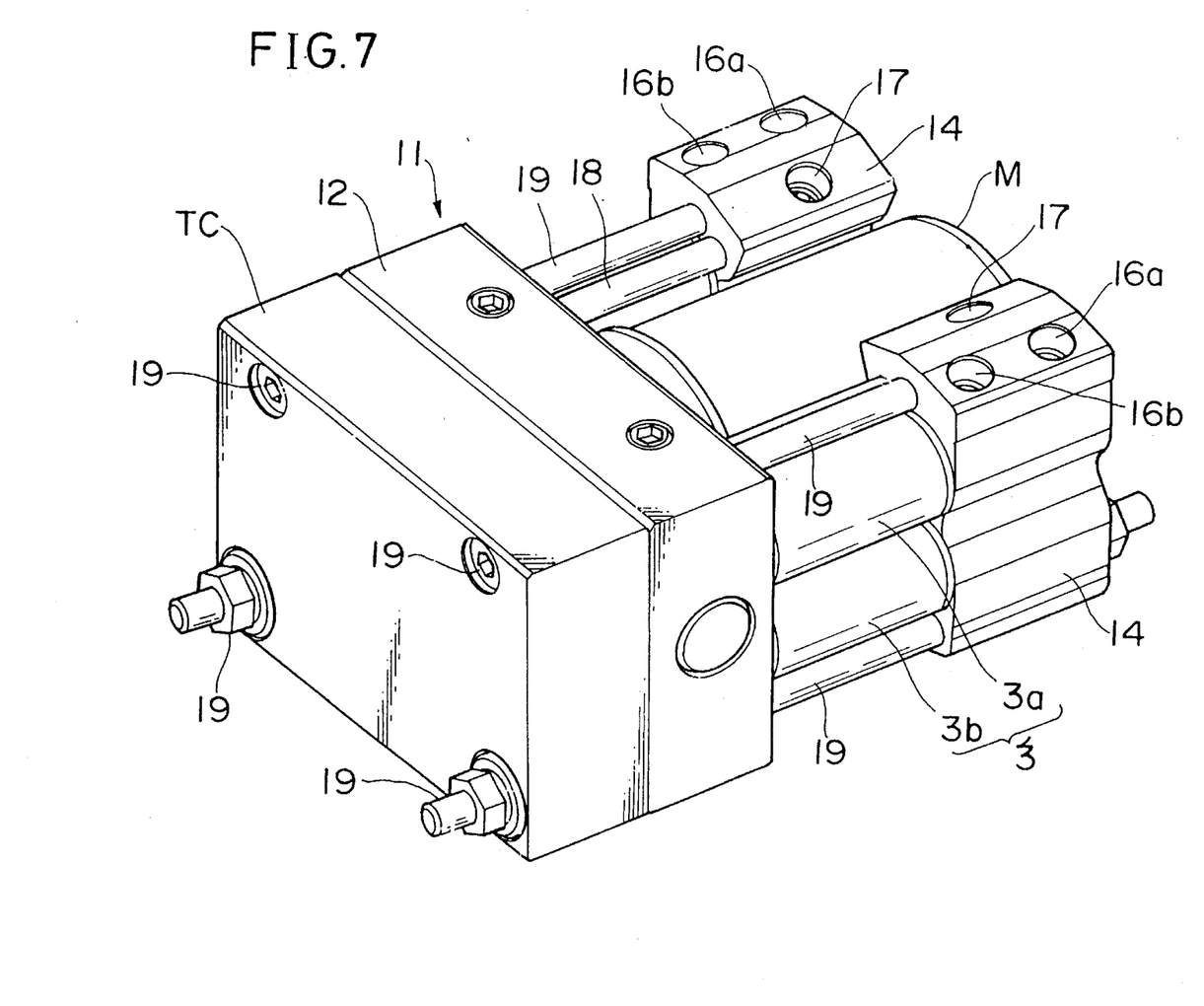
FIG. 7 is a perspective view for showing a fixing structure for a traction control unit for a brake control unit of a still further preferred embodiment of the present invention as viewed from an upper part of a rear surface of the unit.

In a still further preferred embodiment of the brake control unit shown in FIG. 7, a traction control unit TC is fixed to the other surface (the rear surface) of the pump housing block 12 shown in FIGS. 1 to 5, i.e. the surface opposite to the surface to which the motor M is connected. This traction control unit TC is to prevent any slippage of a driving wheel generated in case of starting to drive a vehicle and then a unit formation of these elements enables the brake control unit having an anti-lock control and a traction control to be quite compact one.

According to the present invention, it is possible to provide a brake control unit which can be mounted in a quite small space by making a unit formation of the elements as described above.

What is claimed is:

1. A brake control unit installed in a passage provided between a master cylinder and a wheel cylinder, comprising:

a pump housing block;

a first fluid pressure control valve having one end connected to a planar surface of said pump housing block for controlling a pressure of brake fluid supplied from said master cylinder to said wheel cylinder;

a second fluid pressure control valve having one end connected to said planar surface of said pump housing block for controlling a pressure of brake fluid discharged from said wheel cylinder;

an accumulator installed within said pump housing block for accumulating a brake fluid discharged from said second fluid pressure control valve;

a motor having one end connected to said planar surface of said pump housing block;

a pump arranged within said pump housing block and is driven by said motor for returning the brake fluid from said accumulator to said master cylinder;

wherein said first fluid pressure control valve, said second fluid pressure control valve and said motor are mounted in parallel with one another on said planar surface of said pump housing block.

2. A brake control unit as defined in claim 1, wherein said motor is arranged between said first fluid pressure control valve and said second fluid pressure control valve in a sandwich manner on said planar surface of said pump housing block.

3. A brake control unit as defined in claim 1, wherein the longitudinal axes of said first fluid pressure control valve and said second fluid pressure control valve define a circle which is concentric with the circumference of said motor.

4. A brake control unit as defined in claim 1, wherein said first fluid pressure control valve and said second fluid pressure control valve symmetrically surround said motor on said planar surface of said pump housing block.

* * * * *